(12) United States Patent
Wenzl

(10) Patent No.: US 7,100,168 B1
(45) Date of Patent: Aug. 29, 2006

(54) STRUCTURE AND METHOD FOR CONTROLLING ELECTRONIC DEVICES

(75) Inventor: Lauren B. Wenzl, Niwot, CO (US)

(73) Assignee: Xilinx, Inc., San Jose, CA (US)

( * ) Notice: Subject to any disclaimer, the term of this patent is extended or adjusted under 35 U.S.C. 154(b) by 620 days.

(21) Appl. No.: 09/888,096

(22) Filed: Jun. 22, 2001

(51) Int. Cl.
*G06F 13/10* (2006.01)
*G06F 3/00* (2006.01)
*G06F 3/12* (2006.01)

(52) U.S. Cl. .......................................... 719/321; 710/8
(58) Field of Classification Search ............. 719/321; 716/16; 703/24, 25; 710/8
See application file for complete search history.

(56) References Cited

U.S. PATENT DOCUMENTS

| | | | |
|---|---|---|---|
| 5,379,382 A * | 1/1995 | Work et al. | 710/63 |
| 5,915,106 A * | 6/1999 | Ard | 703/23 |
| 6,012,103 A * | 1/2000 | Sartore et al. | 710/8 |
| 6,145,020 A * | 11/2000 | Barnett | 710/8 |
| 6,249,825 B1 * | 6/2001 | Sartore et al. | 710/8 |
| 6,477,611 B1 * | 11/2002 | Chang | 710/313 |
| 6,480,027 B1 * | 11/2002 | Ngai et al. | 326/41 |
| 6,539,438 B1 * | 3/2003 | Ledzius et al. | 710/8 |
| 6,574,588 B1 * | 6/2003 | Shapiro et al. | 703/24 |
| 6,721,872 B1 * | 4/2004 | Dunlop et al. | 712/28 |
| 6,754,723 B1 * | 6/2004 | Kato | 710/8 |
| 2002/0095501 A1 * | 7/2002 | Chiloyan et al. | 709/227 |

OTHER PUBLICATIONS

Xilinx's Application Note; XAPP172 (v1.0), "The Design of a Video Capture Board Using the Spartan Series"; Mar. 31, 1999; pp. 1-7; available from Xilinx, Inc. 2100 Logic Drive, San Jose, California 95124.*

* cited by examiner

*Primary Examiner*—William Thomson
*Assistant Examiner*—Li B. Zhen
(74) *Attorney, Agent, or Firm*—Julie Stephenson; Bernard Hoffman; LeRoy D. Maunu

(57) ABSTRACT

An interface for an electronic device being coupled to an external device is provided. The interface includes a configurable hardware interface and a storage component for storing a bitstream that configures the configurable hardware interface to implement the driver of the external device. Specifically, the storage component can store one or more bitstreams that correspond to known drivers that can operate with the electronic device. The configurable hardware interface can include a programmable logic device (PLD), a memory, a control interface for controlling the PLD and the memory, and a synchronous communication interface for receiving information from the external device and enabling the control interface. The memory can list the device drivers (i.e. bitstreams) stored in the storage component and their respective addresses. The interface provides the advantage of storing any number of drivers in the device, thereby significantly reducing the time for the two devices to establish communication.

12 Claims, 4 Drawing Sheets

STRUCTURE AND METHOD FOR CONTROLLING ELECTRONIC DEVICES

BACKGROUND OF THE INVENTION

1. Field of the Invention

The present invention relates to controlling electronic devices, and particularly to a configurable hardware interface for interconnecting electronic devices.

2. Description of the Related Art

Electronic devices can encompass many types of devices having various functionalities. These electronic devices could include, for example, laptop computers, personal digital assistants (PDAs), and cell phones. Each of these types of electronic devices includes a predetermined type of device driver.

FIG. 1 illustrates an exemplary system 100 including a plurality of personal computers (PCs) 103 coupled to a server 104 and a printer 106 via an Ethernet connection 105. PCs 103 are further coupled to a modem 101 via a phone cable 102. As known by those skilled in the art, a computer user must obtain and maintain the proper device drivers for printers, faxes, and other peripherals that attach to the computer. This process is time-consuming and tedious for the user. Therefore, a need arises for an interface that allows an unknown device 107 to be coupled to PCs 103, irrespective of the device drivers then installed in PCs 103. Moreover, a need further arises for an interface that allows unknown device 107 to be coupled to any system and to function within that system.

SUMMARY OF THE INVENTION

In accordance with the present invention, an interface for an electronic device being coupled to an external device is provided. The interface includes a configurable hardware interface and a storage component for storing a bitstream that configures the configurable hardware interface to interface with the external device. Specifically, the storage component can store one or more bitstreams that correspond to known drivers that can operate with the electronic device. The storage component can include a standard volatile memory, such as static random access memory.

In one embodiment, the configurable hardware interface includes a programmable logic device (PLD), a memory coupled to the PLD, a control interface for controlling the PLD and the memory, and a synchronous communication interface for receiving information from the external device and enabling the control interface. The memory can list the device drivers (i.e. bitstreams) stored in the storage component and their respective addresses.

In accordance with one feature of the present invention, the synchronous communication interface can receive signals from the external device that indicate whether the external device is a peripheral device or a host device. The synchronous communication interface can also send signals to the external device that indicate whether the origin device is a peripheral device or a host device. A host device controls the communication between the two devices, whereas a peripheral device accepts commands and data from the host device. To provide this functional relationship, the host device can be configured to implement the driver for the peripheral device.

In a host device, the synchronous communication interface sends a command to the control interface to activate a certain driver configuration mode in the PLD. At this point, the PLD can use a stored bitstream in the driver storage or a received bitstream to configure itself to implement the appropriate driver for communicating with the peripheral device.

The control interface determines whether the required driver is stored in the driver storage by searching the memory. If the required driver is already stored in the driver storage, then the control interface directs the PLD to retrieve the bitstream for that driver and to configure itself using that bitstream. If the required bitstream is not stored in the driver storage, then the control interface directs the PLD to receive a a configuration bitstream from the peripheral device, configure itself using that bitstream, and transfer that bitstream to the driver storage. At this time, the control interface also writes a designation of the driver and its address in the driver storage into the memory.

In a peripheral device, the peripheral device sends the host device a designation of the driver needed to communicate with the peripheral device. At this point, the synchronous communication interface waits for a reply from the host device regarding whether the host can internally access the appropriate driver or needs to have the driver transmitted. If the host device can access a stored driver, then the peripheral device waits for commands and/or data from the host device. On the other hand, if the host device needs to have the driver transmitted, then the synchronous communication interface provides a signal to the control interface regarding this requested transmission. The control interface then communicates with the memory, which in turn has the PLD access the address of the bitstream for the driver associated with that peripheral device. The PLD then transmits that bitstream to the host device.

Once the PLD of the host device receives the appropriate driver, the PLD can be configured such that it provides a host interface to that specific peripheral device. Specifically, in one embodiment, the programmed PLD functions as a host interface that can provide control signals and/or data from the host device to the peripheral device and/or provide data from the peripheral device. In another embodiment of the present invention, the programmed PLD can provide the protocols for the host device to communicate with the peripheral device using, for example, an Ethernet interface, a modem interface, or a custom communication interface.

By using a configurable hardware interface in both host and peripheral devices, the present invention provides significant flexibility. Specifically, the PLD of the configurable hardware interface can be configured to facilitate the communication between any two devices. The configurable hardware interface of the present invention also provides the advantage of storing any number of drivers in the device, thereby significantly reducing the time for a host device and a peripheral device to establish communication.

DETAILED DESCRIPTION OF THE FIGURES

Electronic devices can include various types of software for providing their functionality. A first type of software includes a user interface that allows a user to run multiple applications. A second type of software includes an application program interface (API). An API comprises a set of calls that instruct the operating system (OS) to execute predetermined functions. A third type of software includes a hardware interface that sends commands to hardware. These commands can be in a generalized form for a certain type of hardware (e.g. printers) as well as in a specific form for a particular piece of hardware (e.g. the model A1 laser printer manufactured by Company Alpha). The commands in specific form for a particular piece of hardware comprise the driver, as discussed in detail below.

Figure 1:
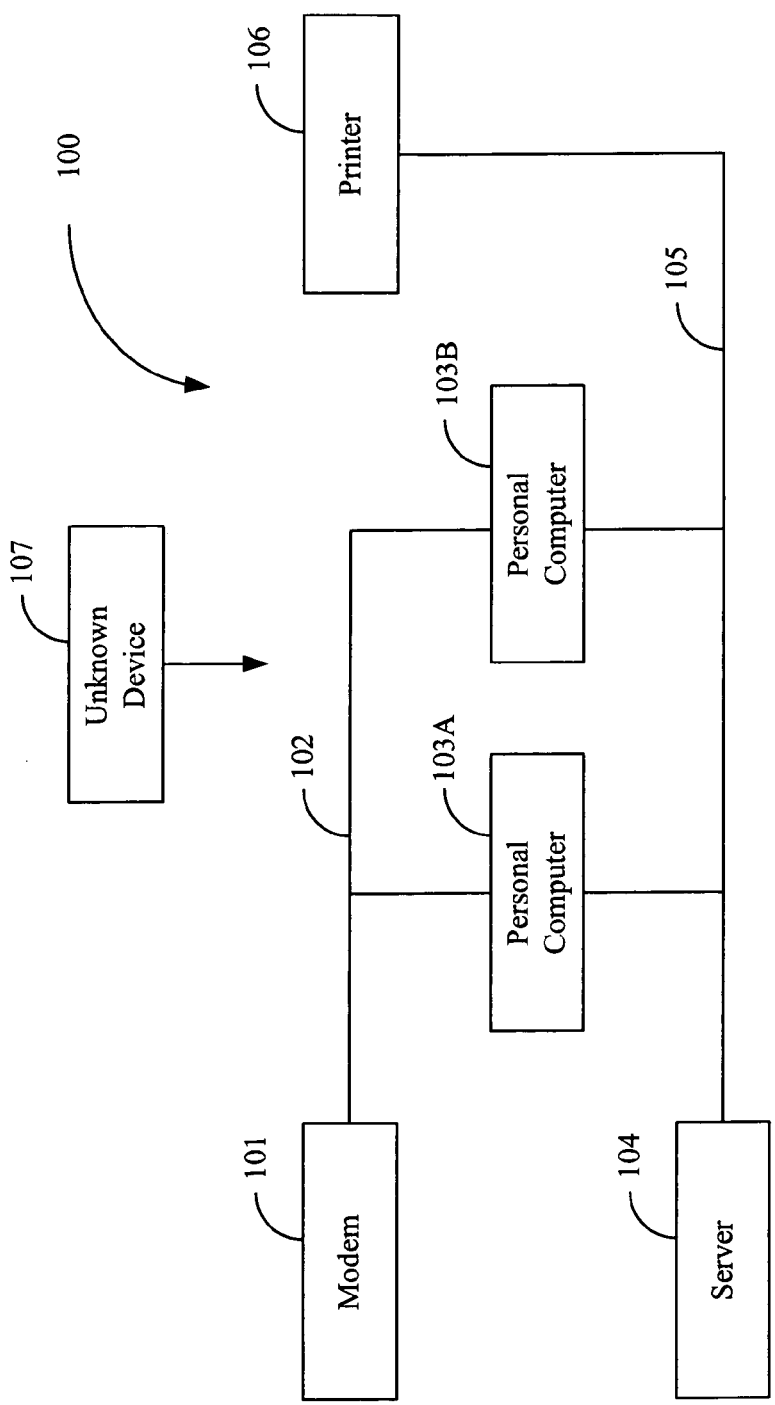
FIG. 1 illustrates an exemplary system including a plurality of electronic devices.
Figure 2:
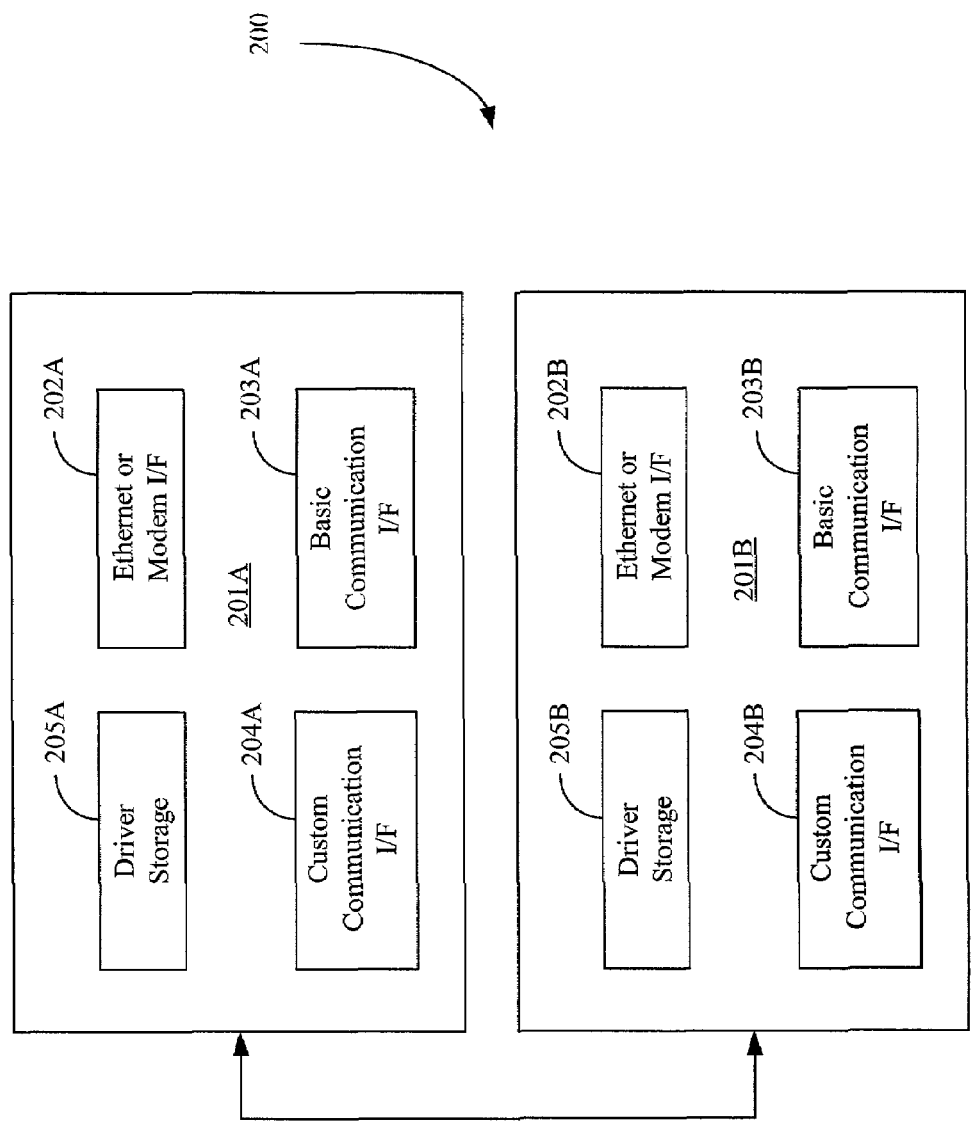
FIG. 2 illustrates a block diagram of an exemplary system including a host device and a peripheral device.

FIG. 2 illustrates an exemplary system 200 including two electronic devices 201, wherein one such device is a host device 201A and the other device is a peripheral device 201B. Host device 201A controls communication between devices 201, whereas peripheral device 201B accepts commands and/or data from host device 201A. Note that the designation of either "host" or "peripheral" is relative. In other words, in another system, host device 201A could be a peripheral device to another host device. Similarly, in yet another system, peripheral device 201B could be a host device to another peripheral device. For example, a PDA could be a peripheral device when coupled to a PC, but would be a host device when coupled to a printer.

Both host device 201A and peripheral device 201B can include a predetermined set of components in accordance with one embodiment of the present invention. These components can include, for example, a basic communication interface 203, driver storage 205, a custom communication interface 204, and an Ethernet/modem interface 202. In other embodiments, additional or fewer components are included in the predetermined set. However, the predetermined set typically includes at least basic communication interface 203 and driver storage 205.

Basic communication interface 203 (explained in further detail below) includes a programmable logic device that facilitates communication between host device 201A and peripheral device 201B. Driver storage 205A can store the known drivers that operate with host device 201A, whereas driver storage 205B can store the known drivers that operate with peripheral device 201B. In one embodiment, driver storage 205 can be implemented with standard volatile memory, such as static random access memory.

Devices 201 can include various interfaces to receive new drivers, upgrades of stored drivers, commands, or data. In this embodiment, devices 201 can include an Ethernet/modem interface 202 that allows communication via the Ethernet or modem. Devices 201 can also include a custom communication interface 204 that allows communication via a proprietary hardware interface. (For example, a proprietary hardware interface could include a cradle for a PDA.) In one embodiment, custom communication interface 204 can be selectively coupled to the Internet, wherein a transmitted bitstream thereon could include a Java API that provides remote access support for device 201, if necessary.

Figure 3:
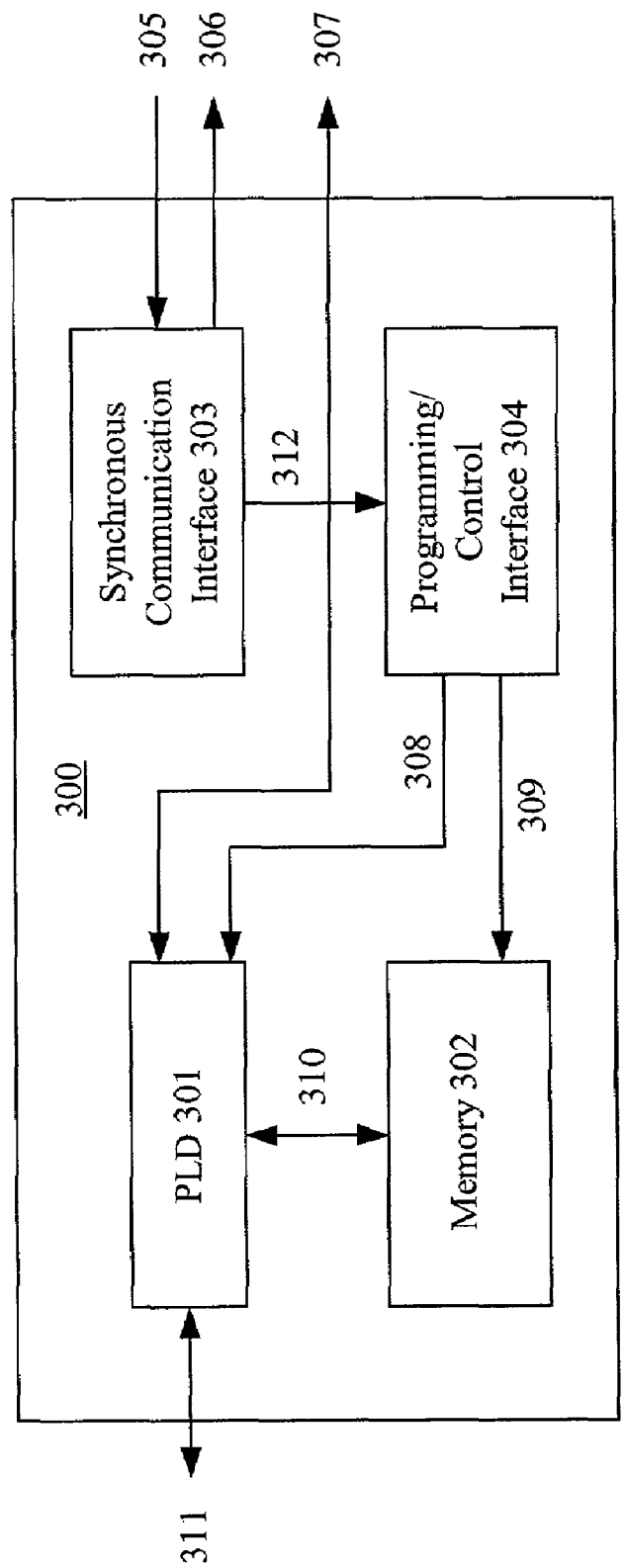
FIG. 3 illustrates a block diagram of a basic communication interface.

FIG. 3 illustrates an exemplary basic communication interface 300 including a programmable logic device (PLD) 301. Programmable logic devices (PLDs) are well known in the art of integrated circuits. In general, a PLD can be user-programmed in the field to implement logic designs. One type of PLD is the field programmable gate array (FPGA). In a typical architecture, an FPGA includes an array of configurable logic blocks (CLBs) surrounded by programmable input/output blocks (IOBs). The IOBs provide the interface between the package pins and the CLBs, whereas the CLBs provide the functional elements for constructing logic on the FPGA. The CLBs and IOBs are interconnected by a hierarchy of programmable routing resources. These CLBs, IOBs, and programmable routing resources are customized by loading a configuration bitstream into the FPGA. This configuration bitstream is generated using known software tools. In accordance with one feature of the present invention, the driver storage can store one or more configuration bitstreams that configure PLD 301 to implement various drivers that operate with that electronic device.

In one embodiment, basic communication interface 300 also includes a synchronous communication interface 303, a programming/control interface 304, and a memory 302. Synchronous communication interface 303 can be implemented using any standard peripheral interface, including, but not limited to, a universal serial bus (USB), a parallel port connector, a serial port connector, or a small computer system interface (SCSI). Synchronous communication interface 304 could employ a handshake or another simple protocol to establish synchronous communication between the host device and the peripheral device. As explained in further detail below, this interface can be used to establish communication with another device to facilitate the transfer of a configuration bitstream.

In FIG. 3, PLD 301 can receive a bitstream via line 307 to configure itself and then store a copy of the bitstream in the driver storage (not shown) via a line 311. Note that line 307 could selectively include one of Ethernet/modem interface 202, custom communication interface 204, or an interface to driver storage 205 (FIG. 2). In one embodiment, memory 302, which typically comprises any standard volatile memory, includes a lookup table of the drivers and their addresses in driver storage 205.

In accordance with one feature of the present invention, synchronous communication interface 303 can receive signals from the external device that indicate whether the external device is a peripheral device or a host device. Synchronous communication interface 303 can also send signals to the external device that indicate whether the origin device is a peripheral device or a host device. As described above, the host device controls the communication between the two devices, whereas the peripheral device accepts commands and data from the host device. To provide this functional relationship, the host device must first be configured to implement the driver for the peripheral device.

If basic communication interface 300 is associated with a host device, then synchronous communication interface 303 sends a command to programming/control interface 304 via line 312 to activate a certain driver configuration mode in PLD 301. At this point, PLD 301 could use a stored bitstream in the driver storage or a received bitstream to configure itself to implement the appropriate driver for communicating with the peripheral device. Programming/control interface 304 determines whether the required driver is stored in the driver storage by searching memory 302 via line 309.

If the required driver is already stored in the driver storage, then programming/control interface 304 directs PLD 301 via line 308 to retrieve the bitstream for that driver using line 311 and to configure itself using that bitstream. In other words, programming/control interface 304 is constructed such that it has the capability to load programs into PLD 301. If the required bitstream is not stored in driver storage 205, then programming/control interface 304 directs PLD 301 to receive a configuration bitstream from the peripheral device via line 307, configure itself using that bitstream, and transfer that bitstream via line 311 to the driver storage. At this time, programming/control interface 304 can also write a designation of the driver and its address in the driver storage into memory 302.

If basic communication interface 300 is associated with a peripheral device, then the peripheral device sends the host device a designation of the driver needed to communicate with the peripheral device. At this point, synchronous communication interface 303 waits for a reply from the host device regarding whether the host can internally access the appropriate driver or needs to have the driver transmitted. If the host device can access a stored driver, then the peripheral device waits for commands or data from the host device transmitted via the Ethernet/modem interface or the custom communication interface.

On the other hand, if the host device needs to have the driver transmitted, then synchronous communication interface 303 provides a signal to programming/control interface 304 regarding this requested transmission. Programming/control interface 304 then communicates with memory 302, which in turn has PLD 301 access the address of the bitstream for the driver associated with that peripheral device. PLD 301 then transmits that bitstream to the host device via line 307.

Figure 4:
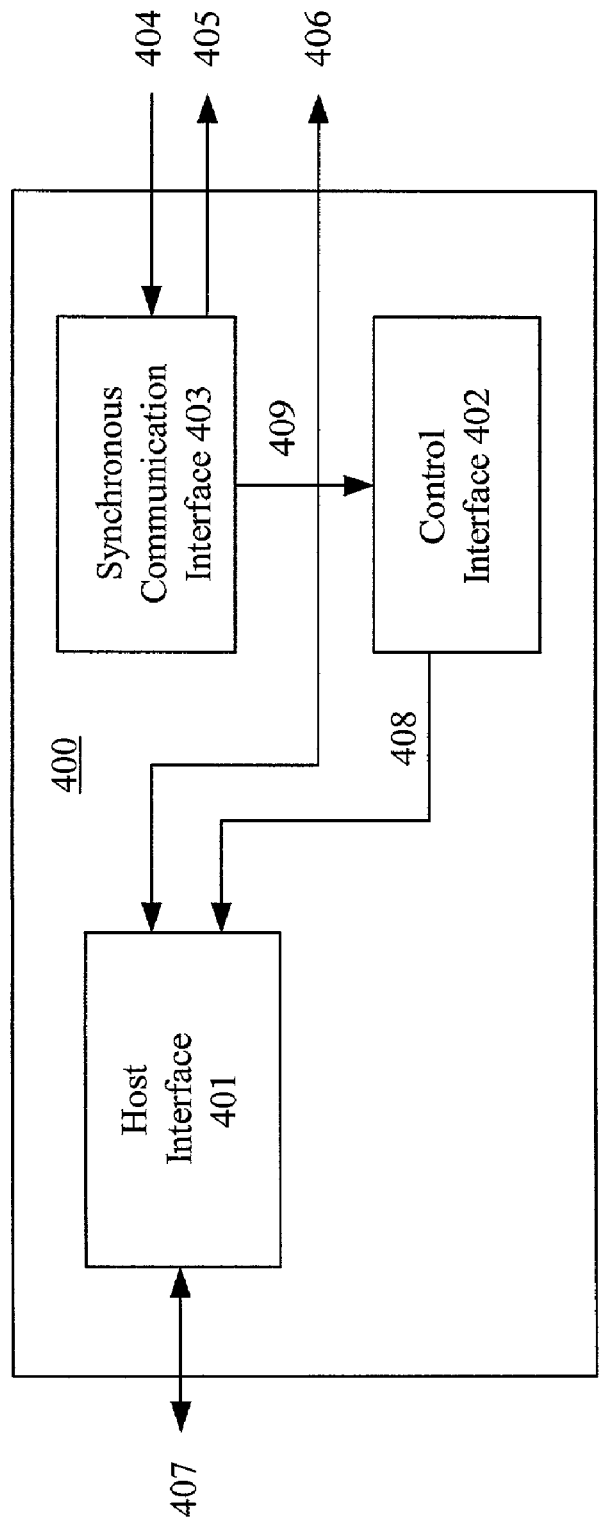
FIG. 4 illustrates a block diagram of one embodiment of a basic communication interface after configuration.

Once the PLD of the host device receives the appropriate driver, the PLD can be configured such that it provides a host interface to that specific peripheral device. For example, FIG. 4 illustrates a basic communication interface 400 providing this functionality. Specifically, the programmed PLD functions as a host interface 401 that can provide control signals and data from the host device (via line 407) to the peripheral device (via line 406) and/or provide data from the peripheral device (also via line 406). In one embodiment, a synchronous communication interface 403 can receive and acknowledge certain system signals, such as Abort and Delay signals, from the peripheral device using lines 404 and 405. Synchronous communication interface 403 interprets these signals and then provides them to a control interface 402 via line 409. Note that control interface 402 is a programming/control interface that has its programming capability disabled. At this point, control interface 402 can provide the appropriate control signals to host interface 401.

In another embodiment of the present invention, configurable communication interface 400 can provide the protocols for the host device to communicate with the peripheral device using an Ethernet/modem interface or a custom communication interface. In this embodiment, line 406 is not actively used.

By using a configurable hardware interface in both host and peripheral devices, the present invention provides significant flexibility. For example, if a printer is connected to an NT workstation, a UNIX workstation, and an unknown host machine, then the printer, upon booting, can initiate communication to any devices connected to its ports using the present invention. Specifically, the PLD of the configurable hardware interface can be configured to facilitate the communication between any two devices. The configurable hardware interface of the present invention also provides the advantage of storing any number of drivers in the device, thereby significantly reducing the time for a host device and a peripheral device to establish communication.

The present invention is described above in reference to various embodiments. Variations and modifications to those embodiments will be apparent to those skilled in the art. Therefore, the present invention is limited only by the appended claims.

The invention claimed is:

1. An interface for coupling electronic devices, comprising:
   a first configurable hardware interface, wherein the configurable hardware interface is resident in a host electronic device and includes:
      a first programmable logic device (PLD);
      a first memory coupled to the first PLD;
      a first control interface for controlling the first PLD and the first memory;
      a first communication interface for receiving information from a peripheral electronic device and enabling the first control interface, the first communication interface adapted to request a bitstream from the peripheral electronic device responsive to a first signal from the first control interface; and
      a first storage component residing in the host electronic device and coupled to the first PLD for storing a plurality of bitstreams that configure the first configurable hardware interface to implement a driver of the peripheral electronic device; and
   a second configurable hardware interface, wherein the configurable hardware interface is resident in the peripheral electronic device and includes:
      a second PLD;
      a second memory coupled to the second PLD;
      a second control interface for controlling the second PLD and the second memory;
      a second communication interface for receiving information from the host electronic device and enabling the second control interface; and
      a second storage component residing in the peripheral electronic device and coupled to the second PLD for storing a plurality of bitstreams, each implementing a driver of the peripheral electronic device;
      wherein, responsive to a second signal from the first communication interface to the second communication interface, a third signal from the second communication interface to the second control interface, and a fourth signal from the second control interface to the second PLD, the second PLD retrieves a selected bitstream from the second storage component and transmits the selected bitstream to the first PLD, and the selected bitstream implements a driver of the peripheral electronic device on the first PLD.

2. The interface of claim 1, wherein at least one of the first and second storage components includes volatile memory.

3. The interface of claim 1, wherein at least one of the first and second storage components includes static random access memory.

4. The interface of claim 1, wherein at least one of the first and second communication interfaces includes one of a universal serial bus, a parallel port connector, a serial port connector, and a small computer system interface (SCSI).

5. The interface of claim 1, wherein the first and second communication interfaces establish synchronous communication between the host electronic device and the peripheral electronic device.

6. The interface of claim 1, wherein at least one of the first and second memories includes at least one lookup table.

7. The interface of claim 1, further including at least one of an Ethernet interface, a modem interface, and a custom interface for communicating with the peripheral device.

8. A hardware implemented method of facilitating communication between two devices, the method comprising:
   identifying a host device, from the two devices, that controls communication between the two devices;

identifying a peripheral device that accepts commands from the host device;

storing a first plurality of bitstreams in the host device, the first plurality of bitstreams corresponding to a first plurality of drivers;

storing a second plurality of bitstreams in the peripheral device, the second plurality of bitstreams corresponding to a second plurality of drivers of the peripheral device;

determining whether one of the first plurality of drivers is a driver of the peripheral device, wherein if one of the first plurality of drivers is the driver of the peripheral device, then selecting a first bitstream corresponding to the driver of the peripheral device and configuring a first programmable logic device (PLD) in the host device with the first bitstream, otherwise, directing the host device to request a second bitstream from the peripheral device;

retrieving the second bitstream from the stored second plurality of bitstreams by a second PLD in the peripheral device in response to the request from the host device, and transmitting the second bitstream from the second PLD to the first PLD; and configuring the first PLD with the second bitstream to implement the driver of the peripheral device.

9. The hardware implemented method of claim 8, further including storing a plurality of designations in the first PLD, wherein each designation corresponds to one of the first plurality of bitstreams, wherein determining includes searching the plurality of designations.

10. The hardware implemented method of claim 9, wherein the plurality of designations are stored in at least one lookup table.

11. The hardware implemented method of claim 9, wherein each designation includes an address for one of the first plurality of bitstreams stored in the host device, and wherein selecting includes accessing an address in the host device for the first bitstream to implement the driver of the peripheral device.

12. A method for configuring an interface, comprising:

storing a first plurality of bitstreams in a first device including a first programmable logic device (PLD), the plurality of bitstreams corresponding to drivers of the first device;

storing a second plurality of bitstreams in a second device including a second PLD, the second plurality of bitstreams corresponding to drivers;

communicating a designation of a driver from the first device to the second device;

determining at the second device whether a first configuration bitstream associated with the designation of the driver is among the second plurality of bitstreams stored in storage of the second device;

configuring the second PLD with the first bitstream in response to the first bitstream being among the second plurality of bitstreams stored in storage of the second device;

communicating a bitstream request from the second device to the first device in response to the first bitstream being absent from the storage;

retrieving a second bitstream from the stored first plurality of bitstreams by the first PLD in the first device in response to the bitstream request from the second device; and transmitting, in response to the bitstream request, the second bitstream from the first PLD in the first device to a second PLD in the second device;

configuring the second PLD on the second device with the second bitstream in response to receiving the second bitstream.

* * * * *